March 27, 1962 H. D. WHITE, JR., ET AL 3,026,630
AUTOMATIC CONTROL SIMULATION
Filed June 24, 1958 9 Sheets-Sheet 2

INVENTOR.
HOSEA D. WHITE, JR.
CHARLES L. COHEN
BY HENRY J. McGINTY

ATTORNEY

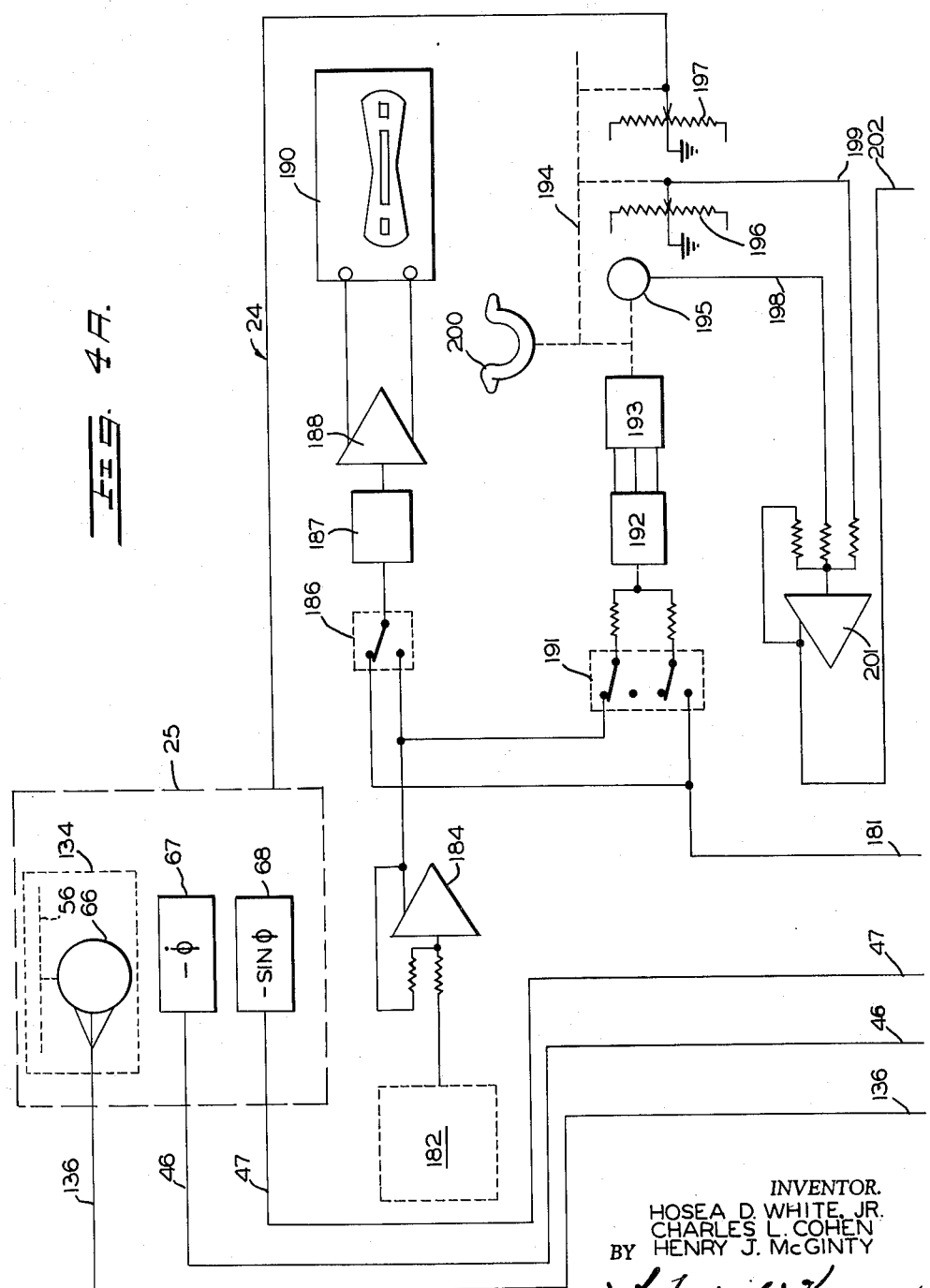

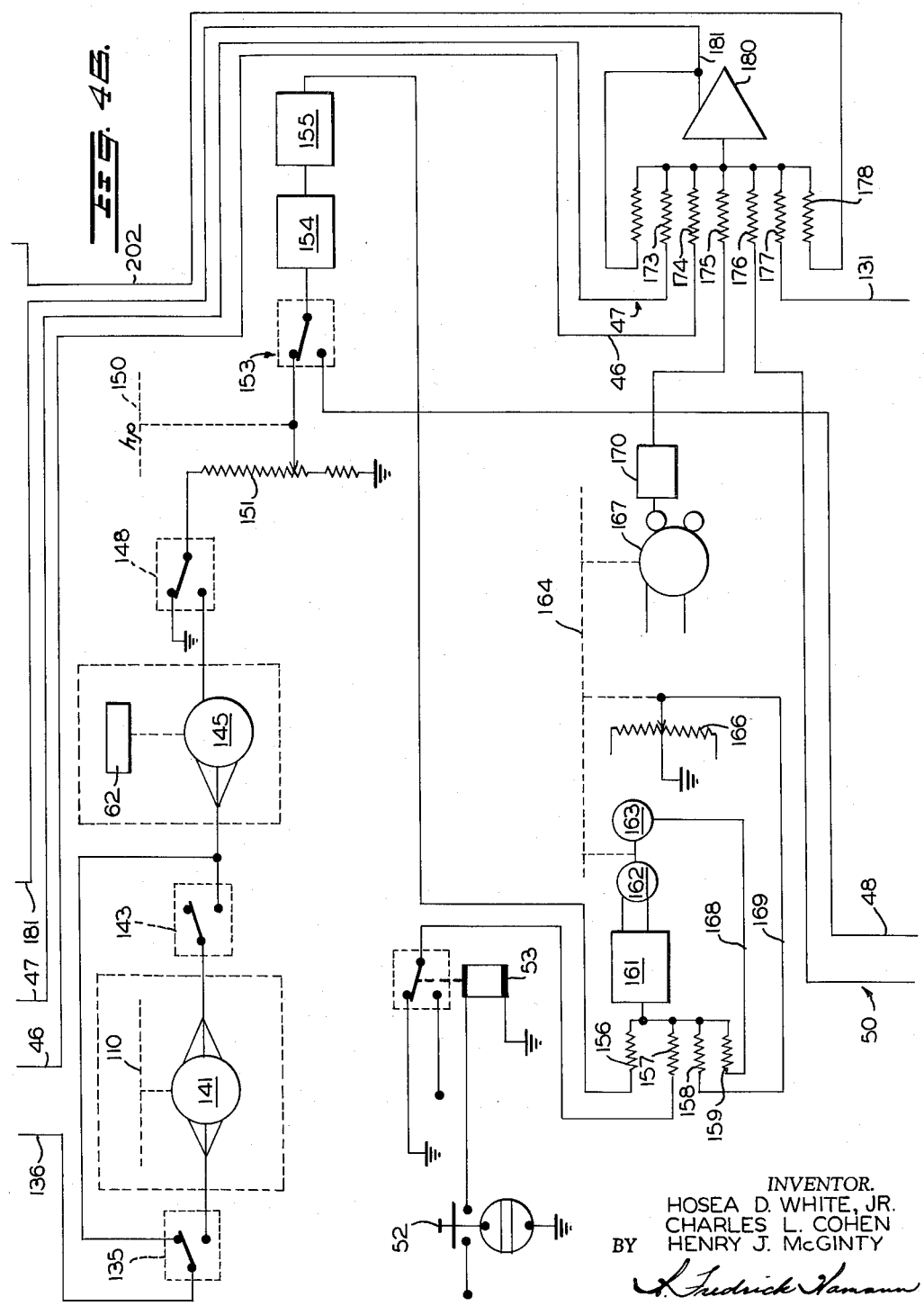

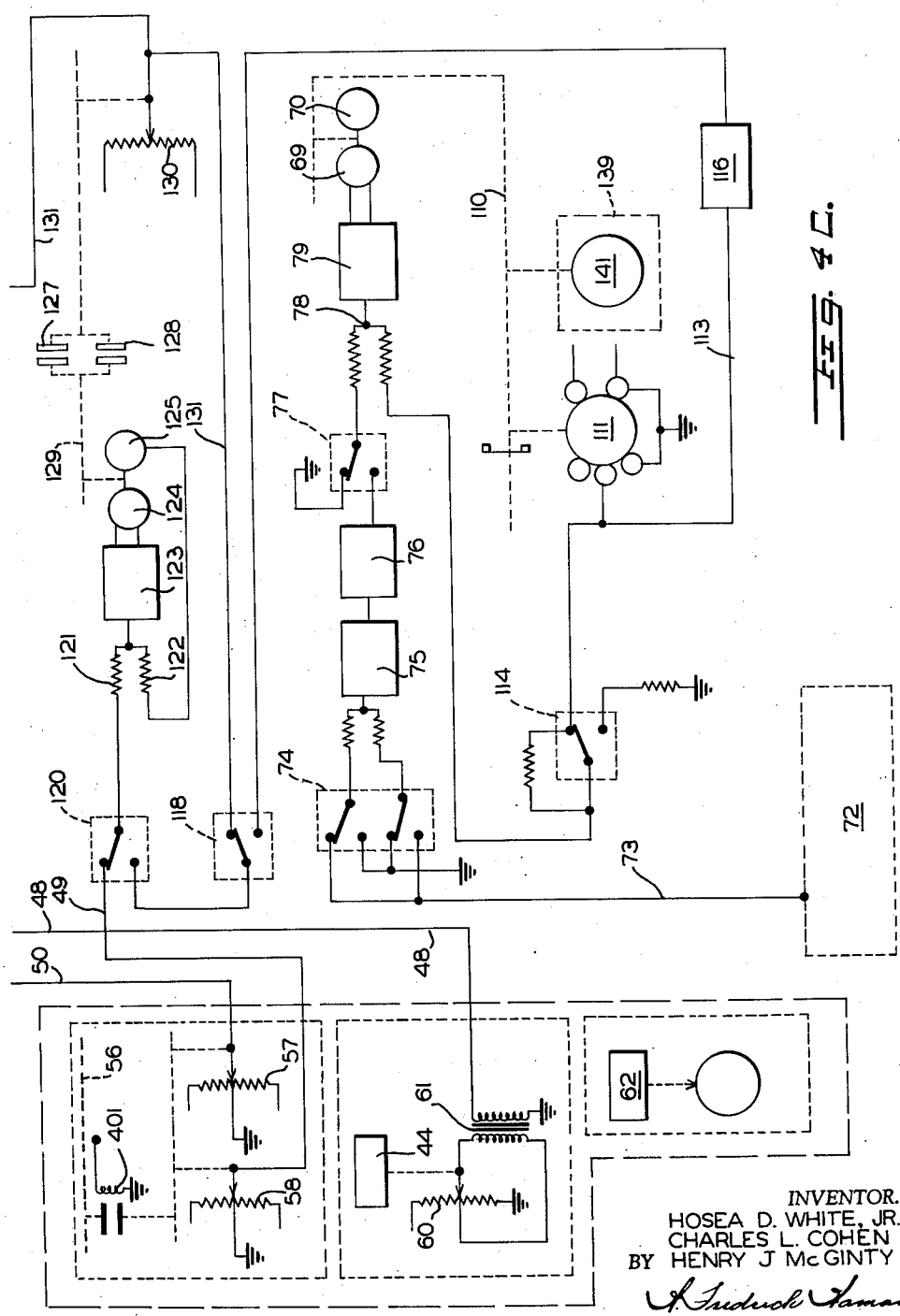

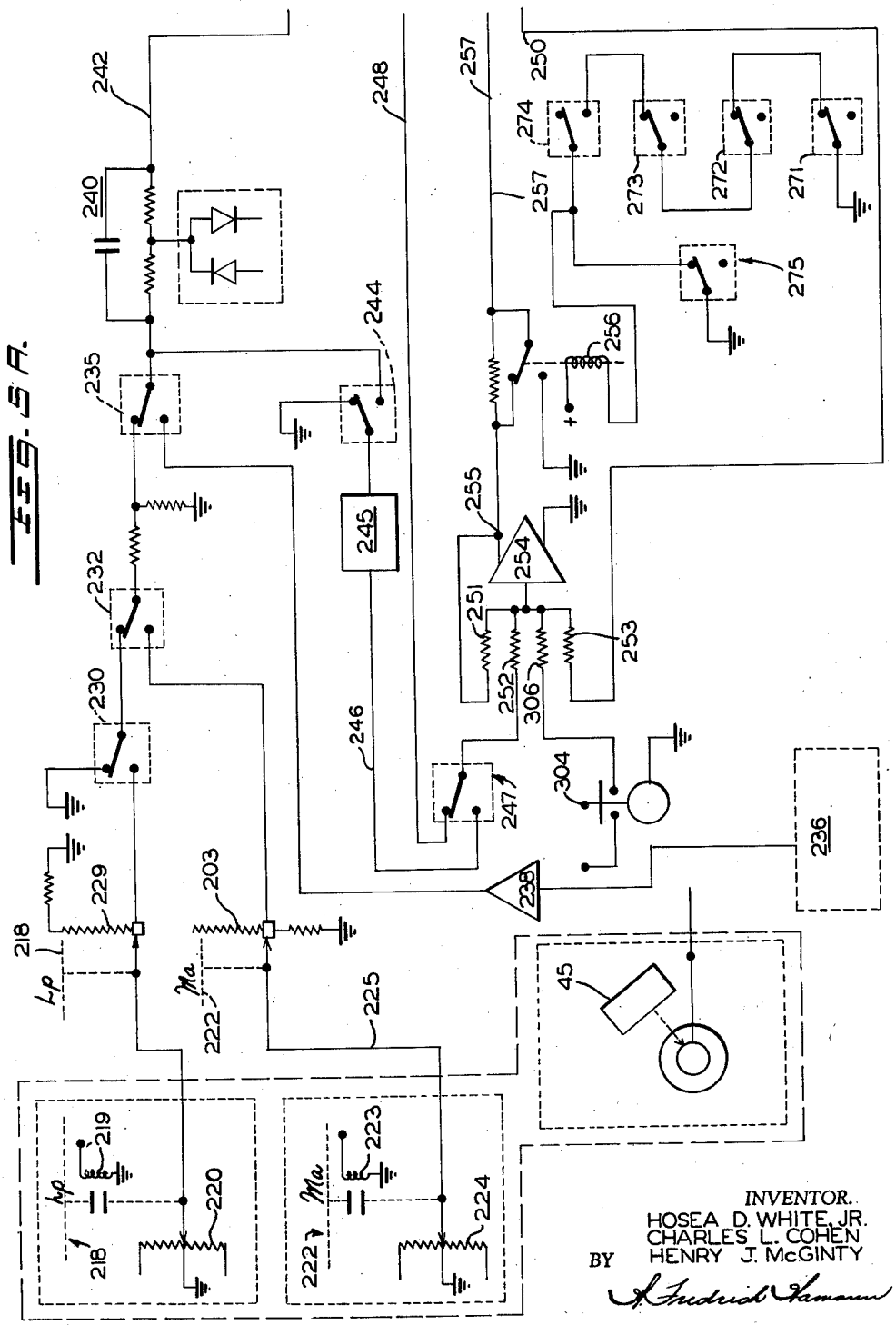

INVENTOR.
HOSEA D. WHITE, JR.
CHARLES L. COHEN
HENRY J. McGINTY
BY
ATTORNEY

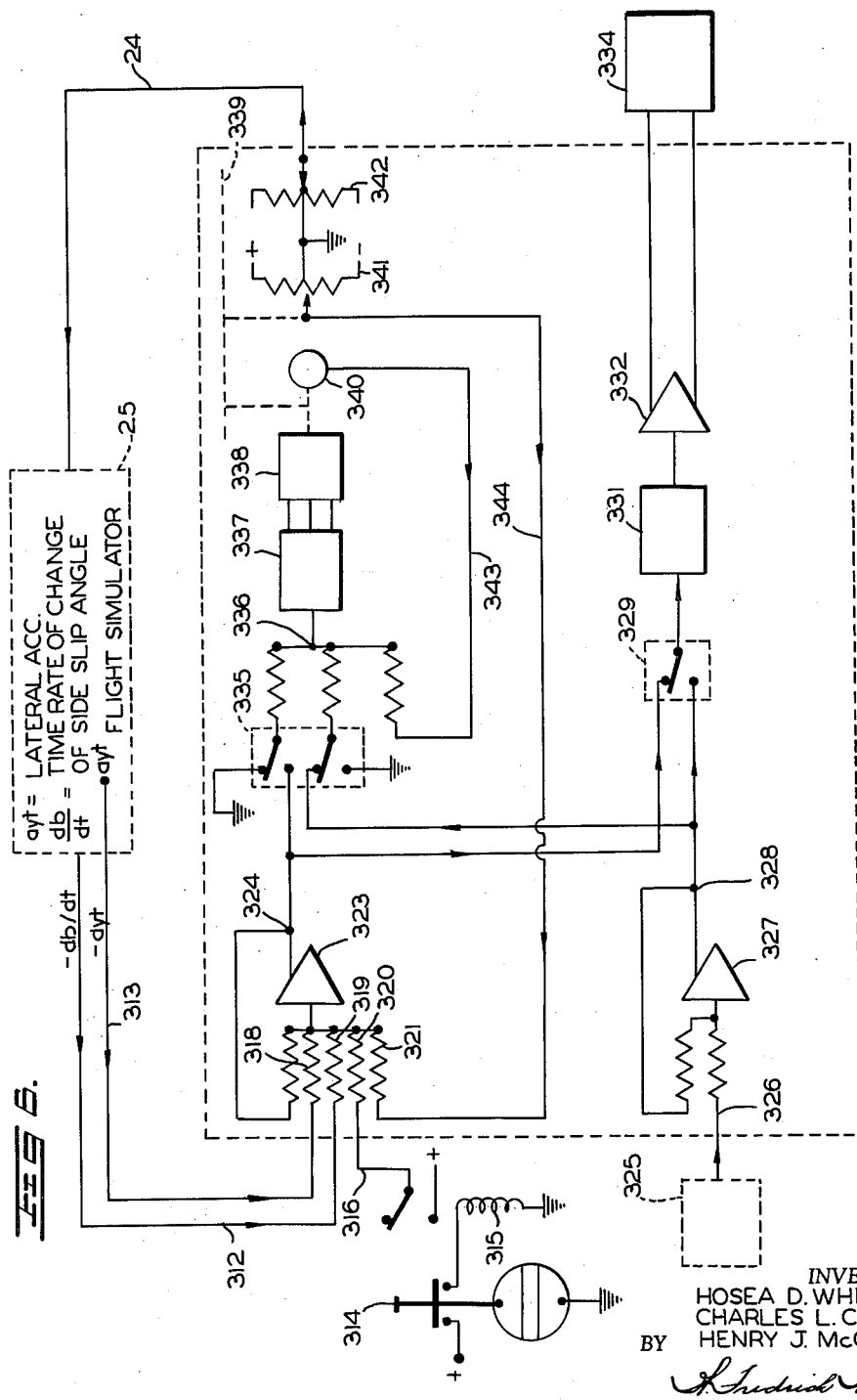

March 27, 1962  H. D. WHITE, JR., ET AL  3,026,630
AUTOMATIC CONTROL SIMULATION
Filed June 24, 1958  9 Sheets-Sheet 9

Fig. 7.

ROLL CHANNEL

| MODE | CONSTANT EQUAL TO ONE | TURN KNOB IN REF. TO DETENT | AIL. SWITCH | VOR-LOC SWITCH | HEADING SELECT SWITCH | RELAY |  |  |  |  |  |
|---|---|---|---|---|---|---|---|---|---|---|---|
| | | | | | | 118 | 120 | 135 | 143 | 148 | 153 |
| HEADING HOLD | K2 | IN | ON | OFF | OFF | D | D | | | | D |
| TURN KNOB | K1 | OUT | | | | D | E | | | D | E |
| HEADING SELECT | K3 | IN | ON | OFF | ON | D | E | D | D | E | D |
| VOR – LOC | K4 | IN | ON | ON | OFF | E | E | E | E | E | D |

PITCH CHANNEL

| MODE | CONSTANT EQUAL TO ONE | ELEV. SWITCH | PITCH ENGAGE SWITCH | ALT. HOLD SWITCH | GLIDE SLOPE | MACH NO. HOLD SWITCH | RELAY |  |  |  |  |  |  |
|---|---|---|---|---|---|---|---|---|---|---|---|---|---|
| | | | | | | | 230 | 232 | 235 | 244 | 247 | 273 | 274 | 275 |
| PITCH MODE NOT ENGAGED | NONE | ON | | | | | | | | | | | D | E |
| PITCH HOLD | K5 & K6 | | ON | OFF | OFF | OFF | E | D | D | E | E | D | E | E |
| ALTITUDE HOLD | K5 & K7 | | ON | ON | OFF | OFF | D | E | D | E | E | E | | |
| MACH NUMBER HOLD | K5 & K8 | | ON | OFF | OFF | ON | D | D | E | E | E | | | |
| GLIDE PATH ENGAGED | K5 & K9 | ON | | | | | | | D | E | E | | | |

NOTE: E INDICATES RELAY ENERGIZED
D INDICATES RELAY DE-ENERGIZED

INVENTOR.
HOSEA D. WHITE, JR.
CHARLES L. COHEN
HENRY J. McGINTY
BY
ATTORNEY

United States Patent Office 3,026,630
Patented Mar. 27, 1962

3,026,630
AUTOMATIC CONTROL SIMULATION
Hosea D. White, Jr., Greenbelt, Charles L. Cohen, Hyattsville, and Henry J. McGinty, West Hyattsville, Md., assignors to ACF Industries, Incorporated, New York, N.Y., a corporation of New Jersey
Filed June 24, 1958, Ser. No. 744,236
8 Claims. (Cl. 35—12)

This invention relates generally to training simulators and more particularly to simulators of automatic control systems for training operators.

Aircraft flight simulators have become essential aids in the training of pilots for aircraft. By initiating a pilot in the operating characteristics of a particular aircraft while he is still on the ground, danger of serious accidents is minimized when actual flight is attempted. Most ground trainers of the prior art have as an object, the training of pilots in manual control and navigation of an aircraft. Although many aircraft in the past have been equipped with automatic controls, simulation of such controls in trainers was only of secondary importance. If the pilot could properly operate an aircraft with manual controls, it was assumed that he could certainly also do so with automatic devices to aid him.

This simplifying assumption is no longer permissible with many of the newer types of aircraft. Extremely high flying speeds have substantially reduced the flying time for any given trip or mission. Yet, in this reduced flight time duration, the pilot must perform all of the functions which would be required for the same mission in the older type, slower aircraft. By taking over some of these functions, his automatic flight and navigational aids have become quite essential to successful operation of high speed aircraft. Their operation must be integrated into the flight plan. No longer can automatic controls in flight and navigation be considered merely as desirable but unessential aids.

The increased need for pilot aids in modern aircraft has motivated development of greatly improved automatic pilot systems. But such improvement has been accomplished only at the cost of increased electrical and mechanical complexity, and corresponding increased complexity of the pilot procedure for proper operation. It is obvious that pilot training for aircraft so instrumented must include training in operation of the automatic controls. To so train the pilot with simulators requires, then, that the automatic controls be realistically modeled as well as the conventional manual controls. This is particularly necessary where the automatic control system is subservient to an operator who can at any time disengage the automatic control system to override a malfunction of the automatic control system, or to reset the automatic control system because of desired change in operating procedure.

Thus, for example, the automatic glide slope of the automatic pilot should be engaged only when the horizontal cross pointer on the course indicator is centered, i.e., the aircraft is not in a steep descent. If the aircraft is below the glide slope when it is engaged the aircraft will go to a climb attitude and could possibly cause a stall condition. To avoid this and other possible dangers it is necessary that complete training in the automatic control system, its limitations and characteristics be provided the student pilot.

There are many other areas in which simulators both of a machine and its automatic control system are needed so that operators can be properly and completely trained. Typical examples are found in nuclear reactor simulators which include automatic control systems and missile systems which include grounded automatic control system monitor apparatus. Although the automatic control systems in the examples mentioned vary in detail, their primary function is the correlation of information with respect to various variables in the system and the presentation of this information to an automatic control system which is responsive to voltages or signals and corrects the controls so that normal operation or desired deviations of operations are carried out.

The preferred embodiment is described in terms of a simulated autopilot system functioning with a flight simulator. However, it is within the purview of the present invention to provide training systems for other devices and/or control systems as, for example, nuclear reactors or missiles.

More generally stated, the present invention contemplates a system wherein a simulated device and simulated automatic control system are used to train a student in the operation of the device and its automatic control system. It provides that the simulated device have an output which represents the operating characteristics of the device, this output varying in a manner similar to the physical characteristics of an actual device. The output indicia or signals are then fed back to the simulated automatic control system which continuously monitors the output signals of the simulated device. Also fed into the automatic control system are indicia or signals representing a desired or predetermined operational procedure. The automatic control system compares these two indicia and/or signals and has an output signal indicating their differences or variations. Such variation information is then fed into the device simulator in which action, tending to reduce the variation or error signal, is automatically taken. The student is able to control not only the device simulator but also the automatic control system simulator thereby giving him the training required for operation of actual devices and control systems. In this manner, he not only gains information on how the automatic control system functions but also what action must be taken with the device in case of a malfunction of the automatic control system, and how an undesirable excursion or malfunction in the device simulator affects the automatic control system simulator.

The primary purpose of an autopilot system in an actual aircraft is to stabilize the flight of an aircraft as characterized by rotations about its three major axes, pitch, roll and yaw, or other characteristic variable of the aircraft. In addition, the autopilot may control altitude, rate of turn, air speed, and/or other characteristics of flight maneuvering. Autopilot systems are well known in the art of aircraft control as is apparent from U.S. Patents 2,707,085, 2,698,723, and 2,710,156, which show the operation and relation between the aircraft and the autopilot system.

The above referenced patents showing actual autopilot systems are given by way of example and are not intended as a limitation on the scope of the present invention.

This invention is directed to but is not limited to use in a flight simulator in which all the controls of an actual aircraft as well as its instruments and other paraphernalia are so faithfully reproduced as to give the student pilot the feeling of actually flying an aircraft. During such a simulated flight, certain operational controls, characteristics and results are environmentally presented to be viewed and operated on by the student pilot. The basic elements of this simulated autopilot system are electronic analog computers which provide a signal in the form of a voltage, a current or a phase or frequency shift whose value is a known function of the value of some physical characteristic of a simulated flight. Analog computers have long been used as implements of simulation devices or tools. In the preferred embodiment of this invention, information is taken from the flight simulator computers and fed to the simulated autopilot system. This system is designed to operate upon the flight simulator information and to actuate the flight controls and produce any other effects which would be presented to a pilot in actual flight.

Therefore, the broad object of the present invention is to provide an apparatus for realistically training a student in the operation of a device having an automatic control system.

Another object of the present invention is to provide a training device in which the student has manual control over both the device and the automatic control system associated with the device.

A further object of the present invention is to provide a device simulator, a control system simulator and manual controls over both said simulators for training a person in the operational characteristics of the device and automatic control systems simulated.

A still further object of the present invention is to provide a device simulator system for training personnel in the operational characteristics of a device having an automatic control system where the trainee may selectively change the operation of either the device simulator or automatic control simulator both of which constitute the device simulator system.

It is a still further object of the present invention to provide a training apparatus including a device simulator having at least one characteristic variable which effects a change in an automatic control system associated with the device simulator and in which the trainee has manual control over both the device and automatic control simulators.

It is a still further object of the present invention to realistically simulate the major control variables of an aircraft autopilot system.

Another object of the present invention is to provide a training apparatus including a device simulator having variables such as pitch, roll or yaw either individually or in combination which are controlled by an automatic control system connected to the device simulator and in which the device simulator is responsive to the variations between the preselected automatic controls and the output of the device simulator representing the particular variable.

Another object of the present invention is to realistically simulate the autopilot system of an aircraft thereby providing training in the limitations and characteristics of the autopilot system.

Another object of the present invention is to realistically simulate the automatic control of the yaw angle of an aircraft.

Another object of the present invention is to realistically simulate the automatic control of the roll angle of an aircraft.

Another object of the present invention is to realistically simulate the automatic control of the pitch angle of an aircraft.

Another object of the present invention is to provide a simulator system which includes an automatic control system, have characteristic variables such as pitch, roll, yaw, altitude, rate of turn air speed, etc., either individually or in combination.

The novel features of the invention are set forth in the appended claims and the invention as to its organization and its mode of operation will be best understood from a consideration of the following detailed description of the preferred embodiment when used in connection with the accompanying drawings, which are hereby made a part of the specification, and in which:

FIGS. 4a, 4b and 4c are interconnecting schematic diagrams of the roll channel of the simulated autopilot system.

FIG. 6 is a schematic drawing of the yaw channel of the simulated autopilot.

FIG. 7 is a chart presentation showing the switch and relay positions for the various modes of simulated autopilot operation.

The preferred embodiment of this invention provides apparatus for realistically simulating the operation of an aircraft autopilot system about the three aerodynamic axes, longitudinal, lateral and normal (roll, pitch and yaw) by controlling the movement of the simulated manual controls in response to the operation of simulated autopilot controls and to computed values from the simulated aircraft flight computer.

Figure 1:
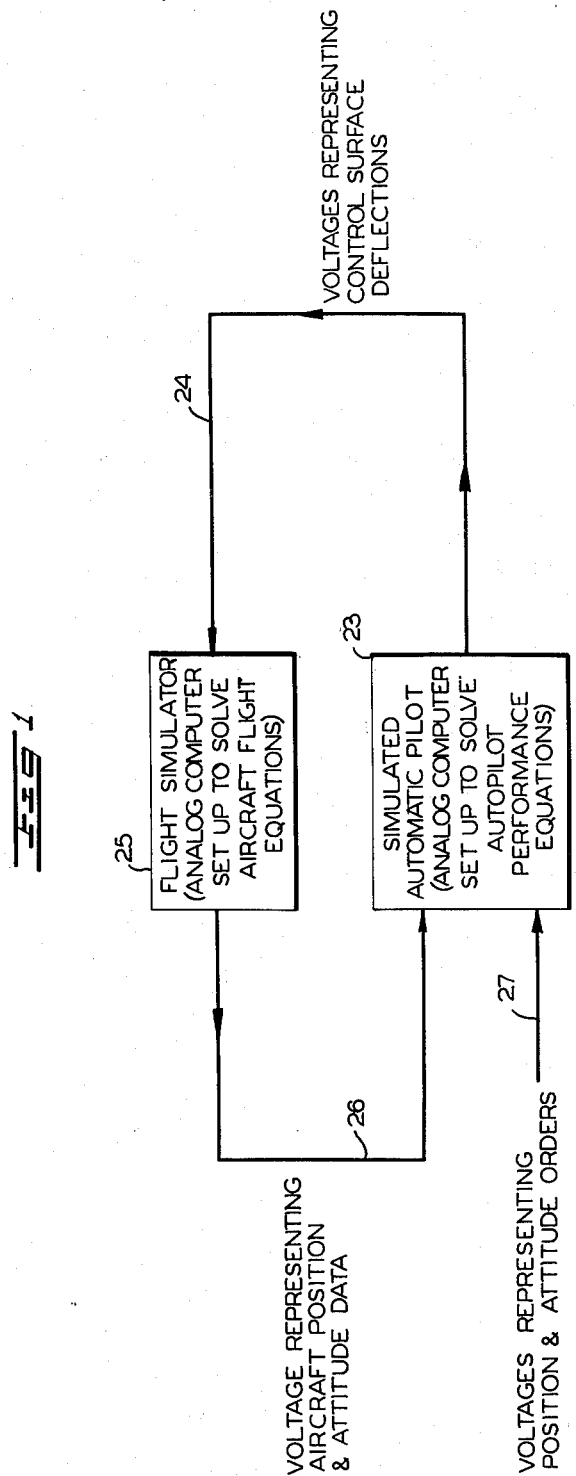
FIG. 1 is a simplified block diagram of a simulated aircraft autopilot system.

Referring now to the figures in detail, FIG. 1 shows a block diagram illustrating the functional relationship between the simulated system and the flight simulator. The flight simulator is represented by block 25. Signals representative of its position and attitude are fed through feedback link 26 to the automatic pilot simulator 23. This actual position and attitude are compared to those desired as set into the automatic pilot simulator through input 27 designated as position and attitude orders. The output of the simulated automatic pilot is transmitted by means 24 to operate upon the flight simulator 25.

Signals representative of the deviation of error between actual and the ordered flight path and attitude are prepared in the simulated automatic pilot computer; these are fed to the flight simulator through link 24. The control surfaces on the simulated aircraft are adjusted by the error signals so as to bring the simulated aircraft into the desired pattern of position, attitude and velocity.

Figure 2:
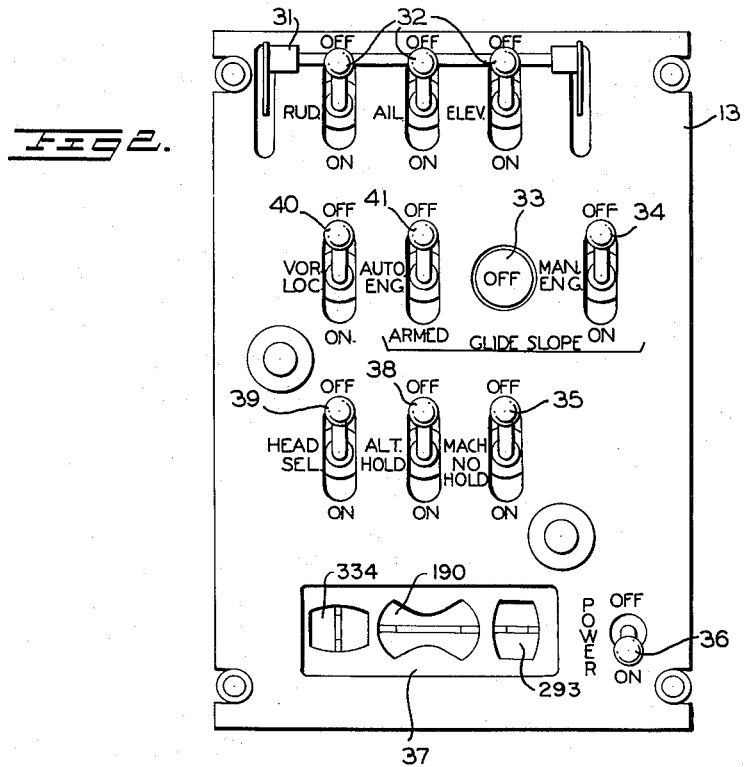
FIG. 2 is an elevation of the simulated autopilot control panel.

The nature and variety of automatic controls which are simulated for the pilot trainee may be appreciated from FIG. 2. Specifically, with respect to the preferred embodiment, the pilot trainee's primary control over the autopilot system is accomplished by means of the various switches located on his autopilot control panel 13, i.e., rudder, aileron, and elevator switches 32, which may be simultaneously moved to the "on" position by means of engaging switch bar 31, automatic engage switch 41, VOR—LOC switch 40, Heading select switch 39, Altitude Hold Switch 38, manual engage switch 34, Mach. No. hold switch 35, and the main autopilot power switch 36.

Even though the autopilot is not engaged, the autopilot amplifiers and auxiliary servos are operating so that the aircraft attitude is constantly being monitored through synchronizing servos. The trim indicators on the mode selector panel monitor the output of the capstan drive servo amplifiers. If they are not zero, the autopilot should not be engaged because an untrimmed condition is an indication of a malfunction in the autopilot except with the aircraft in a roll condition. The autopilot malfunction indicating light is energized when the manual pitch trim switch is actuated or when the capstan servos are overloaded. Actuating the manual pitch trim switch breaks the holding circuit of the pitch engaged relay and deactivates the pitch channel. Re-engaging the elevator switch on the mode selector panel re-energizes pitch channel. Overloading any one of the capstan drive servos is an indication of a break in the control loop. This breaks the holding circuit to all three engaging relays, roll, pitch and yaw and deactivates the complete autopilot. The engaging bar must be actuated to re-engage the autopilot.

The roll channel (aileron) stabilizes the aircraft about the longitudinal axis and also controls the aircraft heading. The stabilizing servo loop senses roll error from a vertical gyro and positions the aileron to correct this roll error. Included in the aileron positioning servo are minor loops to increase the performance of this stabilizing loop such as; rate feedback and roll rate input (rate gyro). The aircraft heading information is transduced to roll command information through the roll synchronizer servo. This servo positions a syncho in the vertical gyro input loop of the "aileron-positioning servo loop" to give the required roll angle for heading error correction. Included in the roll channel are integrating circuits, limiters and an absolute pressure transducer which operate on the heading error signal to increase the performance of the roll channel loop. Actuating the aileron switch 32 of the mode selector panel engages the roll channel to hold the aircraft heading at that which the aircraft was flying when the autopilot was engaged. The "heading hold" is accomplished through the heading synchronizer servo.

Figure 3:
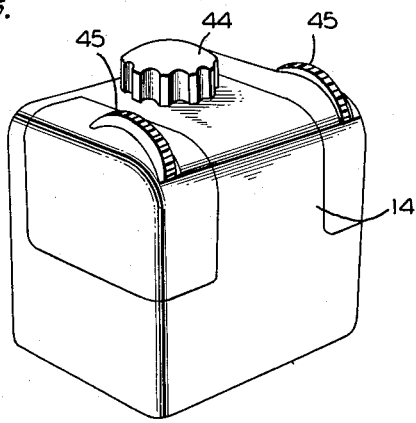
FIG. 3 is a perspective view of the autopilot flight controller.

In addition to the switch control panel 13, the student pilot is provided with an automatic flight controller of which the casing 14 and control handles 44 and 45 are shown in FIG. 3. This controller enables the student pilot to inject automatic turns with knob 44 and pitch effects with wheels 45 into the simulated flight. Both sets of student pilot controls (FIGS. 2 and 3) are outwardly identical to the controls found in actual aircraft. However, we do not limit the scope of our invention to this particular configuration which is shown here only by way of illustration.

Figure 5:
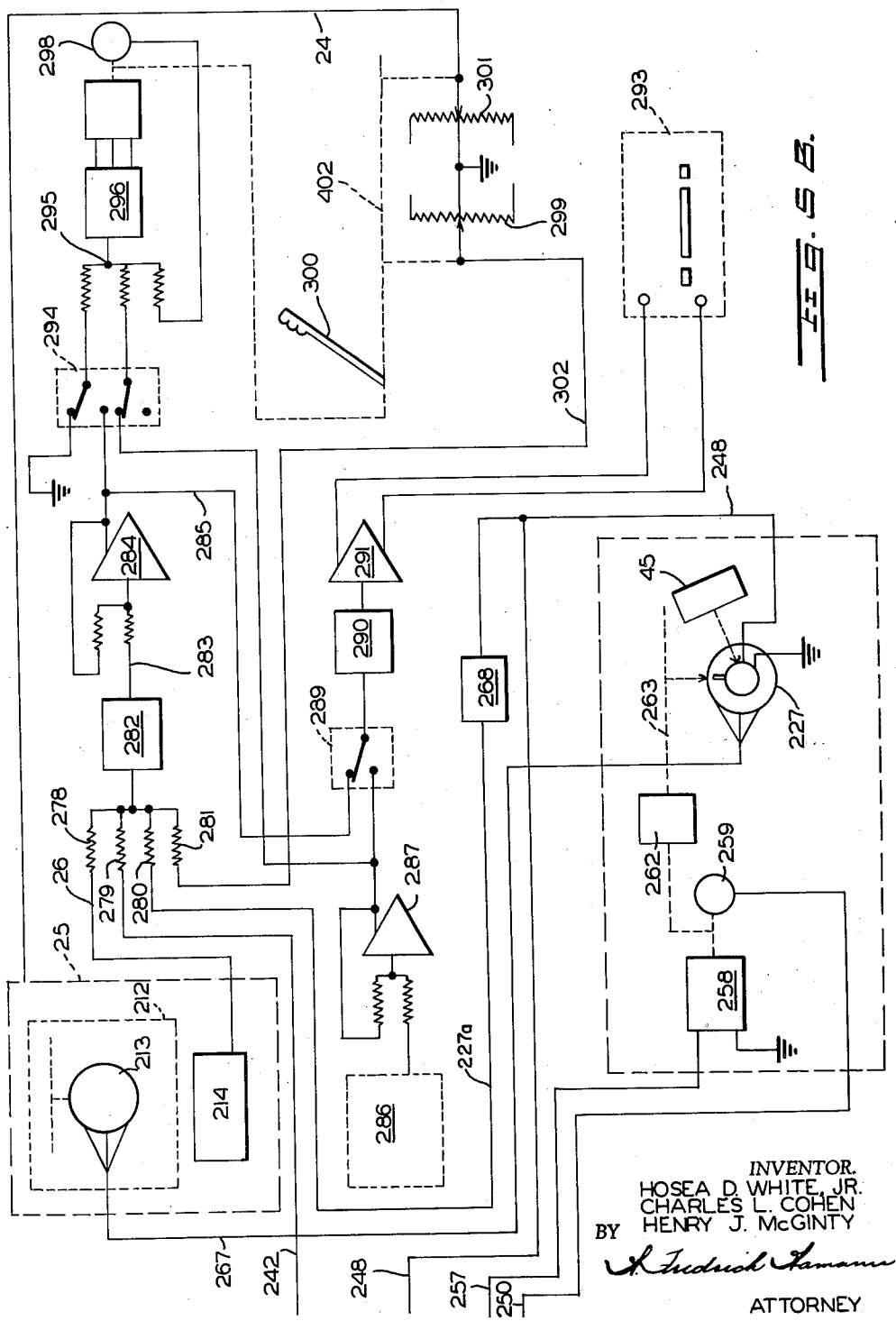
FIGS. 5a and 5b are schematic presentations of the pitch channel of the simulated autopilot.

FIGS. 4 through 6 conform generally to FIG. 1 in which the flight simulator 25 feeds information by means 26 to the simulated autopilot 23 which receives this information and other orders by means 27 and transmits output information by means 24 back to the flight simulator computers 25. Within the flight simulator and simulated automatic pilot system there are many relays which switch various flight functions in accordance with the controls on the autopilot control panel FIG. 2 and the automatic flight controller FIG. 3. The switches of the autopilot control panel FIG. 2, when activated, connect a voltage source to a relay coil. Relay contacts associated with each coil act to open and close the circuits of the autopilot system. The pitch and turn knobs of the flight controller FIG. 3 are connected to center-tapped potentiometers which provide a voltage proportional to the knob displacement for controlling the inputs to the pitch and turn channels of autopilot operation. To avoid undue repetition of relay contacts and parallel connected wiring, the relays shown are arranged to indicate the major control loops and systems within each simulated autopilot channel. The relay contacts shown in FIG. 4, namely contacts 118, 120, 135, 143, 148 and 153 are all depicted in the de-energized condition. When any one of these relays becomes energized, the arm will pivot down to make contact with the third or lower relay contact element.

FIG. 4 shows the schematic representation of the roll channel of the autopilot simulator. The basic parts are the flight simulator 25, feedback path 26, simulated automatic pilot 23, and link 24 which are present as shown in the basic block diagram of FIG. 1. Each of these parts is shown in expanded form in FIG. 4.

In the following detailed description of the apparatus by which the objects of the invention are realized, the various aerodynamic and control system parameters are abbreviated by symbols defined as follows;

A dot over a symbol denotes a time derivative.

Subscript $a$ refers to an actual parameter, subscript $d$ to that desired.

$(\psi)$ = Bearing or Heading Direction
$(\psi_a)$ = Actual Heading
$(\psi_d)$ = Desired or selected heading
$(\Delta\psi) = (\psi_a) - (\psi_d)$, or Heading Error.
$(\phi)$ = Angle of roll about longitudinal axis of aircraft with respect to horizontal.
(VOR—LOC) = Visual Omnirange or Localizer error.
$(S_{sa})$ = Aileron control wheel rotation with respect to center position.
$(e_o)$ = Voltage proportional to force, or cumulative error signal, tending to rotate control wheel.
$\theta$ = Pitch angle or angle of rotation about lateral axis of aircraft with respect to horizontal.
$\theta_a$ = Actual pitch.
$\theta_d$ = Desired or selected pitch.
$(\theta) = \theta_a - \theta_d$, or pitch error.
$MA$ = Mach number or airspeed relative to sound velocity.
$MA_a$ = Actual Mach number.
$Ma_d$ = Desired or selected Mach number.
$\Delta Ma = Ma_a - Ma_d$ or Mach number error.
$\Delta GP$ = Glide path error.
$W_y$ = Pitching rate or approximately $\dot\theta$
$S_{se}$ = Elevator control column position.
$hp$ = Hydrostatic air pressure or a measure of altitude.
$e_o'$ = Voltage proportional to force, or cumulative error signal, tending to move control column.

OPERATION OF THE PREFERRED EMBODIMENT

The autopilot loop for the simulator incorporates the same basic logic as the aircraft autopilot, utilizing positioning and integrating servos, lead circuits, limiting and filter circuits to achieve the required loop transfer functions for positioning the cockpit controls and to present continuous registry of the aircraft's attitude on the cockpit instruments. The aircraft's attitude, such as its roll, roll rate, altitude, Mach, etc., is simulated by the orientation and angular velocity of various shafts. By coupling potentiometers to these shafts, voltages proportional to the various attitudes are made available for computors giving proper solution of the equations representative of the pilot's control and aircraft characteristics. In this way, the output of actual aircraft attitude detectors and transducers such as the vertical gyro, the rate gyro, the lateral accelerometer, etc., are simulated for the trainer. The simulated autopilot and the actual autopilot employ similar mode selectors and flight controllers. The output of each of the three channels, representing roll, pitch and yaw, is fed into its respective control clutch demodulator. This clutch demodulator drives a magnetic actuator which operates on the pilot's control to position it and also to present the required resistance to movement of the control. Aircraft control position information is obtained from the pilot's controls for inputs to the computer section of the simulator, thus closing the loop. This is shown in the simplified block diagram of FIG. 1.

FIG. 1 shows in block form the loop elements of the simulated autopilot system as a whole but it is equally applicable to each of the three channels of operation; roll, pitch, and yaw, which are described later in detail. Since an accurately simulated flight takes into account all forces acting upon the simulated device, the result at any instant is a large number of characteristic variable values which when taken together comprise the flight information. Due to the large number of variables which interconnect and inter-react with other variables, a complete flight equation for any one flight characteristic value becomes quite complex.

The simulated autopilot system described herein is intended to be used where the realistic effects of an automatic control system are desired in their entirety. In such a use, the concurrent operation of the simulated autopilot system to control roll, pitch, and yaw will accurately satisfy the need. To facilitate the description of the autopilot system, the discussion of operation which follows is broken down into the three basic flight axes of roll, pitch, and yaw. In certain types of automatic control system simulation, such as for missiles, it may be considered sufficient to utilize only two of the three flight axes, and such use is satisfied by this invention.

It will be noted in the following explanations that several conversions from 400 cycles to D.C. and from 400 cycles to 60 cycles are made. The following description is of an actual flight simulator—simulated autopilot combination; thus many of the actual aircraft's 400 cycle components must be used to maintain the integrity of the cockpit configurations. The superior qualities of 60 cycle computations, on the other hand, are utilized to mechanize flight equations, hence the conversions are necessary.

ROLL CHANNEL

The operation of the simulated roll channel of autopilot operation will be described by reference to FIGS. 4a, b and c. The stabilization of the aileron-positioning servo loop is simulated through the control force loop which positions the pilot's control wheel 200 and in turn presents the required aileron deflection information, by conductor 24, to the flight computer 25. The input to the control force loop is a summing amplifier 180 which adds the effecting parameters such as: heading error developed at mechanical shaft 56; visual omnirange-localizer (VOR—LOC) error developed at electro-mechanical shaft 110; and roll angle information developed in the flight simulator computer by shafts 67 and 68. These signals in combination are presented to the aileron control loop, thus effecting a positioning of the pilot's control wheel 200 provided the autopilot is engaged.

The inputs to the roll-stabilizing loop are roll angle voltage, sin $\phi$, on conductor 47 and roll rate voltage $\dot{\phi}$ on conductor 46 which are made available from potentiometers coupled to the roll shaft 68 and the roll rate computer 67 and which are tied to the amplifier 180 by impedances 173 and 174. The feedback loop from the control wheel, simulating aileron follow-up, consists of potentiometer 196 and a rate generator 195 mounted on mechanical shaft 194 which is coupled to the pilot's aileron control force actuator 193, and which drives the arm of potentiometer 197 which is connected to means 24. The combined feedback and damping voltages on conductors 199 and 198 are summed at amplifier 201, the combined value being conducted to amplifier 180 by conductor 202 and input impedance 178. The output 181 of amplifier 180 is an A.C. voltage whose amplitude is analogous to the force which should be applied to the control wheel 200 in order to simulate the operation of the control wheel of an actual aircraft when under the direction of an autopilot type of system. This output is fed through relay 186 to demodulator 187, amplifier 188 to trim meter 190 when the roll channel is not engaged and through relay 191 to clutch demodulator 192 to magnetic fluid actuator 193 when the roll channel is engaged. The actuator in turn provides the physical force to drive the control wheel shaft 194 and the apparatus associated therewith.

Heading information is obtained from a synchro 66 coupled to the heading shaft 56 within the heading computer 134 in the flight simulator device 25 and is used as a heading reference in two modes of operation. Also coupled to the heading shaft 56 is a zero-centering spring loaded potentiometer assembly interconnected by a magnetic clutch 401. Engaging the roll channel, by switches on the autopilot control panel, couples the heading synchro 66 to other synchros to eventually drive the roll command servo shaft 164 which in turn supplies heading information to the roll servo amplifier 180. The potentiometers 57 and 58 supply heading error information by conductors 49 and 50, in the Heading Hold mode of operation, to the roll amplifier 180 to give the required control wheel rotation.

The servo containing shaft 110 is actuated by a D.C. signal on conductor 73 from the radio aids computer 72 of the simulator which is analogous in amplitude to the error between aircraft position and radio beam. This D.C. signal is amplified by amplifier 75 and fed into a modulator 76 through a lead network to give position error information. This error is fed to the compensation integrator shaft 129 which generates a signal proportional to the integral of the error represented by shaft 110, to enable the simulated aircraft to simulate the aircraft's bracketing and locking onto the VOR and LOC signals.

Within the roll channel of the simulated autopilot system there are four modes of operation: the "Heading Hold" mode, "Turn Knob" mode, "Heading Select" mode and "VOR—LOC" mode.

The large number of switching operations necessary to accommodate the various needs of the different modes of operation makes it desirable to define the equation for the control wheel position in terms of the roll servo voltage output of roll servo amplifier 180. Equation 1 is such an equation in which the coefficients have been omitted and the constants $K_1$ to $K_4$ will either be equal to one or to zero. If any one of the constants is equal to one, then the other three constants will be equal to zero and their respective terms therefore drop out of the equation. The voltage output of amplifier 180 is $e_0$, which is used to position the control wheel 200. Equation 1:

$e_0 = \sin \phi + \dot{\phi} + Ssa + \dot{S}sa -$ [turn knob demand]$K1$ $+ [\Delta\psi + \int\Delta\psi dt] K2 + [\psi -$ selected heading] $K3$ $+ [\psi-$selected heading$-\Delta$(VOR—LOC)$-\int\Delta$(VOR—LOC)$dt]K4$ If any one of the above constants $K_1$ to $K_4$ equals one then the other three constants equal zero. In Equation 1:

$K_1$ equals 1 when the turn knob 44, FIGS. 3 and 4, is Out of its center detent; zero otherwise. $K_2$ equals 1 when "Heading Hold" is On; zero otherwise. "Heading Hold" is On when the aileron AIL engage switch 32 of the control panel 13 of FIG. 2 is On and the VOR—LOC and "Heading Select" switches 40 and 39 are Off and the turn knob 44 on the autopilot flight controller 14 is in its centering detent.

$K_3$ equals 1 when "Heading Select" is On; zero otherwise. Heading Select is On when both the AIL and "Heading Select" switches 32 and 39 are placed to On with the VOR—LOC switch 40 Off and the turn knob 44 is in the centering detent.

$K_4$ equals 1 when VOR—LOC is On; zero otherwise. VOR—LOC is On when both the AIL and VOR—LOC switches 32 and 40 are on with the "Heading Select switch 39 Off, and the turn knob 44 is in its center detent.

The terms of Equation 1 are defined as follows:

$\Delta\psi=$Heading Error, where:

$\Delta\psi=$(actual)$-\psi$(desired).
Selected Heading=Heading selected by the student pilot by operation of the Heading Selector knob 62.
$\phi=$Roll angle of the simulated aircraft, equal to zero when the wings are level.
$\Delta$(VOR—LOC)=VOR or Localizer error.
$Ssa=$Control wheel deflection; zero at center.
$e_0$ is a voltage representing the force actuating the control wheel.

Consider first the operation of the Heading Hold mode in which $K_2$ is equal to one and $K_1$, $K_3$, and $K_4$ are all equal to zero. The object of this mode is to have the flight simulator hold the heading it is flying at the time the AIL switch 32 on the mode selector control panel 13 is placed in the On position. In this mode Equation 1 becomes Equation 2:

(2)     $e_0=\sin \phi+\dot{\phi}+Ssa+\dot{S}sa+\Delta\psi+\int\Delta\psi dt$

Assume the AIL switch was engaged properly in straight and level flight and when the aileron trim meter 190 indicated the automatic system to be correct. Under such conditions, there would be no roll angle $\phi$ nor any deflection of the control wheel. If such were the case then:

$$\phi=\dot{\phi}=Ssa=\dot{S}sa=0$$

Assume also that the AIL switch 32 was placed to On when the aircraft was flying north ($\psi$ desired=0°) and for some reason the simulator tends to drift in a plus direction, say to plus 9°.

Then
$$\Delta\psi = (\psi a - \psi d) = 9°$$
Since
$$\Delta\psi = \psi(\text{actual}) - \psi(\text{desired})$$
$$\Delta\psi = 9 - 0 = 9$$

Under these conditions, $e_0$ of amplifier 180 will be a plus voltage which will turn the control wheel 200 to the left or to a negative Ssa position until $e_0$ is again zero. This wheel movement, however, will cause the aircraft to bank to the left; the direction to correct the heading error.

The amount of roll on $\Delta\psi$ corresponding to a given wheel rotation is made to conform with the characteristics of a particular aircraft by the proper proportioning of the scaling resistors which feed summing amplifier 180. The sensitivity is obtained from the aircraft manufacturer and mechanized by proper choice of these scaling resistors. $\Delta\psi$ is a voltage analogous to heading error and is taken from the $\Delta\psi$ potentiometer 57 and conducted by connector 50 to the input impedance 176.

Due to errors, e.g., lag and friction, inherent in the system, the heading error $\Delta\psi$ would never return to exactly zero. On long flights this slight error would accumulate to a large position error. For this reason, the small $\Delta\psi$ is integrated by shaft 129 to give a sufficiently large voltage $\Delta\psi$ to bring the simulator exactly on course. Similar corrective means are employed in the actual aircraft autopilot. To accomplish this the $\Delta\psi$ potential present on the arm of potentiometer 58 is conducted by connector 49, through relay contacts 120 to input impedance 121 of amplifier 123. The amplifier 123 provides the motivating potential for motor 124 to drive the mechanical shaft 129 to which tachometer generator 125 and potentiometer 130 are attached. Under these conditions the shaft 129 is driven as an integrator in which the input voltage from potentiometer 58 is integrated in respect to time to yield a voltage on conductor 131 which is the integral of the input. It is seen that since relay contact 120 is de-energized, the conductor 131 voltage does not get back into the input circuit of amplifier 123. The integrating rate is adjusted by means of the input impedance 122 which is connected to the output of generator 125 and the input of amplifier 123, and which thereby controls the feedback effect of the tachometer generator voltage. The integral of $\Delta\psi$, $\int\Delta\psi dt$ appears as a voltage on conductor 131 which is fed to amplifier 180 by means of input impedance 177.

The control wheel is damped by feeding Ssa, the time rate of change of wheel position from generator 195, and the aircraft is damped by inserting the proper amount of $\dot{\phi}$, time rate of change of roll angle from 67 into the loop. Since the flight simulator is designed to obtain a response similar to that of the actual aircraft, the damping in the simulated autopilot computer is essentially the same as that in the actual aircraft autopilot.

The solution of Equation 2 is accomplished in the following manner, references being made to FIG. 4. Assume the student pilot engages the aileron channel when the trim indicator 190 reads zero in which case:

$$\phi = \dot{\phi} = Ssa = \dot{S}sa = 0$$

When "Heading Hold" is engaged clutch 401 on the heading shaft 56 in the flight simulator is engaged and a zero reference is determined. Any error in heading, $\Delta\psi$, will be represented as a voltage at the output of the potentiometers 58 and 57. The output of potentiometer 57 is fed directly, by means of conductor 50, to the input impedance 176 of amplifier 180 while the output of potentiometer 58 is fed by conductor 49 into the Heading Compensator shaft 129. This electromechanical shaft acts as a low speed integrator whose output will be proportional to the integral of heading error with respect to time $\int\Delta\psi\,dt$ and whose shaft position is converted into a voltage by potentiometer 130 and fed into amplifier 180. It should be noted that relays 118 and 120 are both de-energized at this time, so that the Heading Compensator shaft 129 acts as a conventional integrator when in Heading Hold. The Roll Command Shaft 164 remains in its zero position at this time since relays 148 and 153 are de-energized. This puts ground potential on the arm of relay 148, potentiometer 151 connected to altitude shaft 150, its arm, relay arm 153, 400 cycle demodulator 154, 60 cycle modulator 155 and input impedance 156 of amplifier 161. The only other active input to amplifier 161 is by means of input impedance 157 which has a potential impressed across it only when the instructors aileron autopilot failure switch 52 is depressed so as to activate relay 53. The shaft 164 will servo to position such that the position answer voltage on conductor 169 from potentiometer 166 balances out the combined input voltages impressed across input impedances 156 and 157. The amplifier 161 provides the force for activating the motor 162 to which the shaft 164 and the tachometer generator 163 are attached. The generator 163 produces an out of phase potential on conductor 168 for damping the movement of the shaft. The feedback potential on conductor 169 and the damping potential on conductor 168 are impressed on the amplifier 161 by means of the input impedances 159 and 158.

The relays 118, 120, 135, 143, 148 and 153 are shown in FIG. 4 in their de-energized position. When a relay is referred to as being energized, the movable arm makes contact between the single contact and the lower of the two contacts shown in each relay block.

It is thus seen that at the instant the flight simulator drifts to a positive heading error we have a negative A.C. voltage at impedance 176 which is shifted in phase by amplifier 180 to yield a positive phase output voltage $e_0$. This plus phase $e_0$ will cause the control wheel 200 to move to the left or to a negative Ssa position which is converted to a negative voltage by potentiometer 196. This potential on conductor 199 is summed with $\dot{S}sa$ potential on conductor 198, from generator 195, at amplifier 201 and the resulting positive phase answer voltage is coupled to input impedance 178, making $e_0$ equal to zero. The movement of Ssa to the left will cause the flight simulator to bank to the left, to a negative roll angle, causing—sin $\phi$ to be positive in phase. Thus, the voltage at input impedance 173 will become positive causing the control wheel to return to center. The flight simulator will now maintain a left turn with the control wheel at its center position until it gets close to the proper heading. While $\Delta\psi$ is being reduced, the control wheel will turn to the right causing $\phi$ to return to zero.

It should be noted that the only possible steady state condition in this Heading Hold mode of operation is one in which $\Delta\psi$ equals 0, since this is the only condition for which $\int\Delta\psi\,dt$ remains constant. Thus, it is seen that the Heading Compensator shaft 129 will compensate or continually strive to correct any asymmetric conditions in the roll loop.

The Turn Knob mode of operation within the roll channel will now be described with reference to FIG. 4. In this mode of operation, $K_1$ of Equation 1 is equal to one while $K_2$, $K_3$ and $K_4$ are all equal to zero. When the autopilot roll axis is engaged and it is desired to fly a coordinated turn, the turn knob 44 of FIG. 3 may be used. Under these conditions, Equation 1 reduces to Equation 3 shown below, when the turn knob is rotated out of its centering detent.

*Equation 3*

$$e_0 = \sin\phi + \dot{\phi} + Ssa + \dot{S}sa - (\text{turn knob demand})$$

It is clear from this equation, that the steady state condition for a given turn knob demand will be turn knob demand equals sin $\phi$ wherein steady state:

$$e_0 = \dot{\phi} = \dot{S}sa = Ssa = 0$$

Under these conditions the aircraft will take up a steady state bank angle that corresponds to the position of the turn knob 44.

The simulation or mechanization of Equation 3, is accomplished in the following manner.

The heading compensator shaft 129 takes up a zero position since relay 120 becomes energized and relay 118 is de-energized. Thus, the electro-mechanical shaft 129 becomes a zero centering servo. The response of this servo is increased by decreasing the gear ratio by a factor of twenty. The difference in gear train drives is accomplished by actuation of the clutch 127, the high speed gearing, or clutch 128 for the low speed gearing. The high speed gear train is coupled when either $K_2$ or $K_4$ is equal to zero. The output voltage from this shaft 129, made up at potentiometer 130, becomes and remains zero volts as long as the turn knob 44 remains out of its centering detent. Since $K_2$ is equal to zero, indicating the Heading Hold is Off, the clutch 401 on Heading shaft 56 de-energizes and the potentiometers 57 and 58 return to their center positions by spring action, thus making $\Delta \psi$ equal to zero. A 400 cycle A.C. voltage representing the Turn Knob position is formed at potentiometer 60. This voltage is connected by transformer 61 and conductor 48 to the energized contact of relay 153. Since relay 153 is energized, this voltage controls the position of the Roll Command shaft 164 by servo action, to a computed position value, by proper choice of scaling impedances 156 and 157. The position information of the Roll Command shaft 164 is converted into voltage information representing the sine of the Roll Command condition at the synchro generator 167. This voltage is limited at limiter 170 to a Roll Command equivalent to the roll angle limit of the autopilot being simulated and is fed to the input of amplifier 180 at impedance 175. Since relay 153 is energized, it is clear that sine (roll command) is equal to minus the turn knob demand and Equation 3 is satisfied. When the turn knob 44 of controller 14 is returned to its center position detent, $K_1$ becomes zero and $K_2$ becomes equal to one. The simulated autopilot will then be operating in the Heading Hold mode rather than in the Turn Knob mode as just described.

A third mode, the Heading Select mode of operation is intended to allow the pilot to select a Heading to which the flight simulator will automatically turn upon energizing the proper Heading Select controls. During this mode of operation, $K_3$ is equal to one while $K_1$, $K_2$ and $K_4$ are all equal to zero. When the Heading Select switch 39 on mode selector control panel 13 is placed to On and the turn knob 44 of the flight controller 14 is in the detent, Equation 1 reduces to Equation 4 below:

*Equation 4*

$$e_0 = \sin \phi + \dot{\phi} + Ssa + \dot{S}sa + \psi - \text{Selected Heading}$$

Equation 4 therefore, in a steady state condition, will reduce to:

$$\psi = \text{Selected Heading}$$

since $e_0$ would be equal to Heading minus Selected Heading. During steady state:

$$e_0 = \sin \phi = \dot{\phi} = Ssa = \dot{S}sa = 0$$

It is thus clear from the Equation 4 that the Heading of the flight simulator will become equal to the Heading selected by the Heading Selector knob 62. The equipment used to satisfy Equation 4 will now be described. Assuming that the flight simulator is flying level at a heading of $+20°$ from North and that a heading of $45°$ is selected on the Heading Selector Knob 62 at the time the Heading Selector Switch 39 of the mode selector control panel 13 is switched to the On condition. Since relay 148 is energized and relays 135, 143 and 153 are de-energized, the 400 cycle voltage input to the 400 cycle demodulator 154 will be the analog voltage of:

$$-(\psi - \text{Selected Heading}) = -(20-45) = -(25°)$$

This is accomplished by applying the 400 cycle heading signals on conductors 136 through relay contacts 135 to heading select synchro 145 where the heading selected by heading select knob 62 is electrically subtracted from the training device heading. This 400 cycle voltage is converted to 60 cycle by the 60 cycle modulator 155. This Roll Command voltage appears as a positive 60 cycle voltage at input impedance 156 and causes the Roll Command shaft 164 to assume a positive dial reading that is proportional to Heading minus selected heading. This positive dial reading is converted into a positive phase voltage by the synchro generator 167. It is limited by limitor 170 to a value that will produce a roll angle of no more than that possible in the actual autopilot system. This positive (sine of roll command) voltage at input impedance 175 will cause the control wheel 200 to move to the right and the flight simulator will compute a bank angle causing a turning rate to the right. As heading approaches 45°, the autopilot will cause the wheel to turn to the left and the simulated aircraft will smoothly roll out of its bank and assume a heading of 45° with a zero degree bank angle. The simulator will now fly the Selected Heading of 45° until some other autopilot mode is selected.

The Visual Omnirange-Localizer, VOR–LOC, mode of autopilot operation for the Roll Channel will now be described with reference to FIGS. 2 and 4. There are two main objectives for this mode of operation. The first objective is to have the autopilot fly the aircraft to a preselected Omnirange (VOR) beam and then fly down the beam towards the VOR station. The beam is selected by the heading select knob 62 of the pilot's radio aids equipment. The second objective is to have the autopilot fly the aircraft to a preselected localizer (LOC) beam and to fly the aircraft down the beam towards the runway. The instructor selects the proper VOR and LOC stations to which the student pilot should fly. The range and bearing to these stations are computed by the flight simulator 25 and fed into the radio aids computer 72. After the student pilot performs the proper switching with his radio aids equipment, the output of the radio aids computer will be a D.C. voltage proportional to the beam error, i.e., the difference between the aircraft position and the beam position. It is the function of the VOR— LOC mode of the autopilot then to fly the flight simulator to this beam and then maintain a zero beam error; that is, $\Delta$ (VOR—LOC) equals zero. With the autopilot roll axis engaged and the VOR—LOC switch 40 of control panel 13 in the On position, $K_4$ becomes one and $K_1$, $K_2$ and $K_3$ are all equal to zero. This Equation 1 reduces to Equation 5 below:

*Equation 5*

$$e_0 = \sin \phi + \dot{\phi} + Ssa + \dot{S}sa + (\psi - \text{Selected heading}) \\ - \Delta(VOR-LOC) - \int \Delta(VOR-LOC)\, dt$$

It will be noted from Equation 5 that the autopilot accurately represents the VOR—LOC mode of operation. The desired result is to make $\Delta$ (VOR—LOC) equal to zero since by the definition of $\Delta$ (VOR—LOC), the simulator will then maintain a course such that it will be on the beam. Since both heading and beam error information appear in Equation 5, it is impossible for the simulated aircraft to orbit around some point at the side of the beam. It will be further noted that the integral of beam error appears in Equation 5. Therefore, the only steady state condition that is possible to maintain is one in which the beam error is equal to zero. This makes it possible for the simulated aircraft to maintain a zero beam error in a cross wind since it will then fly down the beam with a crab angle; that is, an angle other than a straight line approach. In the general steady state condition; only $e_0$, $\dot\phi$, $\Delta$ (VOR—LOC) and $Ssa$ will be zero since sin $\phi$, $Ssa$, the heading minus selected heading, and the integral of $\Delta$ (VOR—LOC)$dt$ are not necessarily zero but will be some constant value. Thus, when the simulated aircraft is on the beam, Equation 5 reduces to Equation 5a below:

*Equation 5a*

$\Delta$(VOR—LOC)$=0=$sin $\phi+Ssa+(\psi-$Selected Heading$)$
$-\int\Delta(VOR-LOC)dt$ Where:

$\int\Delta$(VOR—LOC)$dt=$Constant

If we assume symmetric power conditions then $Ssa$ will be zero in steady state and Equation 5a reduces to Equation 5b below:

*Equation 5b*

$\int\Delta$(VOR—LOC)$dt=$Constant
$=$sin $\phi+(\psi-$Selected Heading$)$

If there is no wind and the flight simulator is powered symmetrically, then for steady state the integral of beam error ($\int\Delta$(VOR$-$LOC)$dt$) will also be equal to zero thus, this Equation 5 reduces to the simple expression in steady state condition:

Heading $(\psi)=$Selected Heading

This is applicable with no wind, with symmetric power, and when the Selected Heading is the desired VOR beam.

The simulator apparatus for solving Equation 5 will be described with references to FIG. 4. The $\Delta$(VOR—LOC) shaft 110 converts the D.C. beam error voltage 73 to a shaft rotation. Relay 74 is a means of changing the sensitivity of the shaft 110; that is, means to alter the number of degrees of shaft rotation per degree of beam error as a function of whether the beam to be followed is a localizer beam or a VOR beam. Thus, shaft 110 will assume a position proportional to the beam error. Mechanical stops are located on the shaft 110 such that they limit $\Delta$(VOR—LOC) to some value, thus eliminating possible ambiguities and increasing the response of the shaft. D.C. amplifier 75 and 60 cycle modulator 76 convert the low level D.C. VOR—LOC error signal voltage to a 60 cycle voltage suitable to drive electromechanical shaft 110 as a servo mechanism. Shaft 110 is driven by the potential at terminal 78 which is amplified by amplifier 79 to activate motor 69 so as to drive the shaft, tachometer generator 70, synchro 111, and differential generator 141 shown within block 139. Relay 77 and relay 114, when de-energized cause the shaft 110 to be a tight position servo. These relays are energized when in the VOR—LOC mode of operation and the shaft 110 under such circumstances operates as a 60 cycle servo mechanism. The output of the shaft is a synchro differential generator 141 whose rotor position represents $\Delta$(VOR—LOC). This differential generator shown as block 139 is shown functionally between relays 135 and 143 on FIG. 4B. A second output of the $\Delta$(VOR—LOC) shaft 110 is to be found from the synchro generator 111 which transmits a voltage by means of conductor 113 to limiter 116. Since relays 135, 143 and 148 are energized and relay 153 is de-energized, the input to the roll command shaft 164 will be the voltage analog of:

$-(\psi-$Selected Heading$-\Delta$(VOR—LOC)$)$ and the roll command shaft will position to give a sine (roll command) of the correct phase and magnitude to correct the beam error. During this time, the heading compensator shaft 129 will be integrating the beam error since relays 120 and 118 are both energized. The limiter 116 is inserted at the input of the integrator so that for a large $\Delta$(VOR—LOC), the $\int\Delta$(VOR—LOC)$dt$ will not produce a large error resulting in abnormal overshoot when the flight simulator crosses the beam. It is thus evident that the VOR—LOC mode of operation in the simulated autopilot system performs the functions necessary to realistically position the control wheel in its roll axis operation in a manner similar to that accomplished by the actual autopilot system.

When the autopilot is not engaged the analog voltage of the computed force at the control wheel is developed at computer 182 of FIG. 4A, amplified at amplifier 184 and conducted through relay 191 to act as the movitating force for the control wheel 200. When the autopilot is engaged relays 186 and 191 are both energized and the computed force from computer 182, the force present in the absence of autopilot influences, is applied to the trim meter 190 on trim meter 37 of FIG. 2 so that those forces may be monitored by the pilot during autopilot operation.

PITCH CHANNEL

A second channel of flight operation to be simulated by the simulated automatic pilot system is in pitch operation. The purpose is to stabilize the simulated flight as regards variation in nose up or nose down flight attitude. The operation of the aircraft elevator positioning servo loop is simulated through the flight simulator's control force loop which, when the autopilot is engaged, positions the pilot's control column and, in turn, presents the required elevator position information to the flight computer 25 in the form of an analog voltage 24 as shown in FIG. 5. The equation written for the error voltage $e_0'$ that positions the control column is Equation 6 shown below. This voltage appears at conductor 283 and represents the summation of the voltages fed to the 60 cycle modulator 282.

*Equation 6*

$$e_0' = Sse - Wy + (1-K_5) - K_6(\theta - \text{pitch knob demand})$$
$$-f_x(hp)\left\{\Delta(hp) + \frac{d\Delta(hp)}{dt} + \frac{1}{f_x(hp)}\int[f_xhp\cdot\Delta(hp)]dt\right\}K7$$
$$\pm f_y(Ma)\left\{\Delta(Ma) + \frac{d\Delta(Ma)}{dt}\right.$$
$$\left.+\frac{1}{f_y(Ma)}\int[f_y(Ma)\cdot\Delta(Ma)]dt\right\}K8$$
$$+\left[\Delta(GP) + \frac{d\Delta(GP)}{dt} + \int\Delta(GP)dt\right]K9$$

The performance of the autopilot is a function of Mach number and altitude. The dependence of the control column sensitivity on Mach number and/or altitude has an important bearing on the transient response of the flight simulator in the pitch channel. These functions of Mach number and altitude are made up by function potentiometers on the altitude and Mach shafts 218 and 222 in the flight computer of FIG. 5. The outputs of these potentiometers are respectively designated as $f(hp)$ and $f(Ma)$. The Mach and altitude shafts are located in the flight computer 25. Altitude represents the computed pressure altitude and Mach is the computed Mach or velocity quantity. In order to explain the operation of the autopilot, it is desirable to simplify Equation 6 by neglecting the variation in control sensitivity as a function of altitude and as a function of Mach. The simplified expression becomes Equation 7 below:

*Equation 7*

$$e_0' = Sse - Wy + (1-K5) - (\theta - \text{pitch knob demand})K6$$
$$-\left(\Delta hp + \frac{d\Delta hp}{dt} + \int\Delta hp\,dt\right)K7$$
$$+\left(\Delta Ma + \frac{d\Delta Ma}{dt} + \int\Delta Ma\,dt\right)K8$$
$$+\left(\Delta GP + \frac{d\Delta GP}{dt} + \int\Delta GP\,dt\right)K9$$

Where the $K_5$, $K_6$, $K_7$, $K_8$ and $K_9$ are defined as follows:

a. $K_5$ is equal to one when pitch is engaged and is otherwise equal to zero. Pitch is engaged whenever the elevator (ELEV) switch 32 of the control panel is On.

b. $K_6$ is equal to one when Pitch Hold is On and is otherwise equal to zero. Pitch Hold is On whenever pitch is engaged and the Alt. Hold switch 38, the Glide Slope switch 34, and the Mach No. Hold switch 35 are all Off.

c. $K_7$ is equal to one when Altitude Hold is On and is equal to zero otherwise. Altitude Hold is On whenever pitch is engaged and the Alt. Hold switch 38 is On and the Mach No. Hold and Glide Slope switches 35 and 41 are Off.

d. $K_8$ is equal to one when Mach Hold is On and is equal to zero otherwise. Mach Hold is On when the Mach No. Hold switch 35 is placed to On and pitch is engaged; the Alt. Hold and Glide Slope switches being Off.

e. $K_9$ equals to one when Glide Path is engaged; zero otherwise. Glide Path is engaged whenever the automatic engage (Auto. Eng.) switch 41 is On and the aircraft intercepts the Glide Path or whenever the manual engage (Man. Eng.) switch 34 is On. The elevator switch 32 must also be On.

When the glide slope auto engage switch 41 and glide slope manual engage switch 34 are in the off position the glide slope indicator 33 will show off. When the glide slope manual engage switch 34 is off and the glide slope auto engage switch 41 is armed and before the simulated aircraft reaches the glide slope, the glide slope indicator 33 will show arm. When the glide slope auto engage switch 41 is in the arm position and the simulated aircraft crosses the glide slope or the glide slope manual engage switch 34 is moved to the on position the glide slope indicator 33 will show Eng.

With reference to $K_6$, $K_7$, $K_8$ and $K_9$; if any K is equal to one, the other three K's all equal to zero.

If $K_5=1$, only one of $K_6$, $K_7$, $K_8$ or $K_9$ may equal to one, the rest must equal zero.

If
$K$=zero, then $K_6$, $K_7$, $K_8$ and $K_9$ also equal zero.

Definitions of the terms of Equation 7 are as follows:

$\Delta\theta$=pitch error=$\theta$ (actual)−$\theta$ (desired)
$\Delta hp$=altitude error=$hp$ (actual)−$hp$ (desired)
$\Delta Ma$=Mach No. error=$Ma$ (actual)−$Ma$ (desired)
$\Delta GP$=Glide Path error.
Plus pitch command=Nose up command.
$\theta$=Pitch Angle.

$Wy$=Pitching rate $\left(\text{approximately } \frac{d\theta}{dt}\right)$ $Sse$=Control Column Position
$Ma$=Mach number
$hp$=Pressure altitude
$e_0'$ is a voltage which represents the force acting upon the control column.

The first mode of operation to be discussed will be that of pitch mode not engaged with autopilot power turned on. In this mode of operation, $K_5$ through $K_9$ are all equal to zero. When the autopilot power is on, i.e., switch 36, but the elevator (ELEV) switch 32 is not engaged, the simulator is flown manually. In this mode of operation, the pitch trim meter 293 monitors summing amplifier 284, where summing amplifier 284 represents the output of the autopilot pitch channel. To prevent any violent motion of the control column when pitch is engaged, $e_0'$, the voltage analog of the force on the control column, must be zero at the time of engagement. $e_0'$ is a voltage measured at the output of summing amplifier 284 and which may be measured on conductor 285. The pitch trim meter 293 then gives an indication of how large a transient will occur when the autopilot pitch axis is engaged. The function of the pitch synchronizer shaft 263 is to maintain $e_0'$ at zero independent of the pitch angle at the time pitch is engaged. Since relay 275 is energized, and relay 274 is de-energized, relay 256 will be de-energized, the output of amplifier 254, which is dependent on the voltages applied to impedances 251, 252, 253 and 306, will be conducted by connectors 255 through contacts of relay 256 to conductor 257 to activate motor 258 which in turn will drive shaft 263 on which tachometer generator 259 and gear box 262 are mounted. The generator 259 output is conducted by connector 250 back to the input of amplifier 254 to act as a damping factor for the operation of shaft 263. It will be noted that when relay 247 is de-energized, lead 248, $\Delta\theta$, is connected to amplifier 254. Shaft 263 acts as a servo whose input from $\theta$ shaft 212 is the output of a synchro 213 on lead 267 which is subtracted from the output of synchro control transformer 227 located on the output shaft 263. Thus, whenever pitch angle, $\theta$, changes, the pitch synchronizer turns in such a direction as to reduce the increment $\Delta\theta$ to zero. Thus, if the pitch loop is trimmed out at the time of energizing pitch, there will be no transient voltage. It is important for the student pilot to make sure his pitch trim indicator 293 on trim meter 37 of FIG. 2 reads zero before turning the ELEV switch 32 to the On position. The force felt by the student pilot at the control column 300, when the autopilot pitch mode is not engaged, is derived from the elevator force computer 286 which supplies a force analog voltage to amplifier 287 whose output is fed to contacts of relays 294 and 289. The analog voltage representing the computed autopilot forces, which is the output of amplifier 284, is also fed to autopilot engaged relays 294 and 289 so that with autopilot engaged and relays 294 and 289 energized, the control column is driven by the output of amplifier 284 while the trim meter 293 monitors the output of amplifier 287. The A.C. voltage appearing on the arm of relay 289 is fed to the demodulator 290 and the resulting D.C. output acts as the input signal to the D.C. amplifier 291.

Another mode of operation within the pitch channel of the simulated autopilot system is the Pitch Hold mode. During this mode of operation, $K_5$ and $K_6$ are equal to one and $K_7$, $K_8$ and $K_9$ are all equal to zero, and Equation 7 becomes 7a:

Equation 7a:

$e_0'=Sse-Wy-(\theta-\text{Pitch Knob Demand})$

Equation 7a is based on the assumption that the student pilot has properly trimmed out the longitudinal loop before engaging the autopilot. This action positions the control column to a neutral position. If the longitudinal loop has been trimmed before engaging the autopilot $e_0'$, $Sse$, $Wy$ and $\Delta\theta$ will be equal to zero. Thus: $\Delta\theta=0$−Pitch Knob Demand−$\theta$ desired; this establishes a zero reference. Assume that for some reason, pitch angle $\theta$ increases. In such a case:

$\Delta\theta-\theta$ (actual) −$\theta$ (desired) and is a plus quantity. Since relays 273, 272 and 271 are de-energized and relay 274 is energized at the time pitch engaged mode is energized, relay 256 is energized so as to ground conductor 257 and the pitch synchronizer 263 is therefore frozen. As long as the pitch knob 45 is not rotated, both the stator and rotor of the synchro control transformer 227 are fixed. It is clear that the 400 cycle voltage out of synchro 227 which appears on conductor 248 will be proportional to the pitch error $\Delta\theta$. This positive $\Delta\theta$ at the output of synchro 227 is converted to a plus D.C. voltage at the 400 cycle demodulator 268 which is coupled to input impedance 280 at the 60 cycle modulator 282 resulting in a negative $e_0'$. The negative $e_0'$ will cause the control column 300 to move forward, feeding voltage into the flight simulator from potentiometer 301, by conductor 24 to cause the aircraft to pitch down. This is the proper direction to reduce the error in $\theta$ to zero. The positioning voltage for this servo is developed at potentiometer 299 and fed by conductor 302 and input impedance 281 to the modulator 282. Thus, the pitch angle is held at the value it had when Pitch Hold was engaged. Damping is accomplished by feeding a pitching rate, omega Y, (Wy) signal from simulator computer 214 by conductor 26 into the control force loop at impedance 278. This omega Y voltage is computed in the flight simulator 25. The control column is further damped by feeding the time rate of change of the control column position Sse into the control column positioning servo system. Sse is made up by the A.C. tachometer 298 on the mechanical shaft 402 and the voltage is fed back to summing point 295 of the clutch demodulator 296.

The Altitude Hold mode of operation is intended to maintain the altitude present when the autopilot is engaged. In this mode of operation, $K_5$ and $K_7$ of Equation 7 are both equal to one while $K_6$, $K_8$ and $K_9$ are all equal to zero. Equation 7, therefore, reduces to Equation 7b during this mode of operation.

*Equation 7b*

$$e_0' = Sse - Wy - \left[\Delta hp + \frac{d\Delta hp}{dt} + \int \Delta hp\, dt\right]$$

It is clear from the above equation and by the definitions of terms previously stated that the only steady state condition possible for $e_0'$ to be equal to zero is for delta altitude, ($\Delta hp$), to be equal to zero. The integral of delta $hpdt$ term, ($\int \Delta hp\, dt$), integrates out any small altitude error thus making any long time error in altitude negligible. The derivitive of the delta altitude term is used for damping and is formed at the coupling network 240 whose output is then conducted by conductor 242 to input impedance 279. The apparatus for computing the solution to Equation 7b is indicated as follows:

At the time the Altitude Hold switch 38 on the mode selector control panel 13 is placed to On, the clutch 219 on the altitude shaft 218 is engaged and a zero reference voltage representing the altitude of the simulator at the time of engagement is obtained at the output of potentiometer 220. This voltage, therefore, will be the analog of delta $hp$ ($\Delta hp$) times $K_7$. The delta $hp$ ($\Delta hp$) times $K_7$ term is then multiplied by a function of altitude at potentiometer 229. This is one of the functions neglected in simplifying Equation 7 shown above.

Since relay 232 and relay 235 are both de-energized and relay 230 is energized delta $hp$ ($\Delta hp$) voltage will be coupled to the "differentiating" network 240 whose output will contain both $$\Delta hp \text{ and } \frac{d\Delta hp}{dt}$$

information. The term $$\Delta hp + \frac{d\Delta hp}{dt}$$

is, therefore, coupled to input impedance 279 and determines the Pitch Command. At the output of relay 235, the $\Delta hp$ signal is also coupled to the 400 cycle modulator 245 through energized relay 244 where the D.C. voltage is converted to a 400 cycle voltage capable of driving the pitch synchronizer shaft 263 as an integrator, the modulator 245 is also connected by means 246 to relay 247. The pitch synchronizer shaft 263 is no longer frozen since relay 273 is now energized de-energizing relay 256, and the shaft now acts as an integrator or rate servo. Relay 275 is energized by operation of the power "on" switch. Its output is then converted to a 400 cycle voltage at the synchro control transformer 227 and demodulated by the 400 cycle demodulator 268 to yield a D.C. voltage which is the analog of the integral of $\Delta hp\, dt$. The purpose of this voltage is, therefore, to constantly correct any long term error in altitude.

The Mach number hold mode of operation has for its purpose the stabilizing of the simulated flight about the Mach number existing when the autopilot is engaged. During this mode of operation, $K_5$ and $K_8$ are both equal to one while $K_6$, $K_7$ and $K_9$ are all equal to zero. Equation 7 therefore, reduces to Equation 7c below:

*Equation 7c*

$$e_0' = Sse - Wy + \left(\Delta Ma + \frac{d\Delta Ma}{dt} + \int \Delta Ma\, dt\right)$$

It is clear that the only steady state condition possible in Equation 7c is for delta mach ($\Delta Ma$) to equal zero. The mechanization of Equation 7c is analogous to that of Equation 7b; the only difference being that the error information upon which the system depends is an error indication as to Mach rather than as an indication from altitude. This delta mach or mach error voltage is developed from the operation of the clutch 223 on Mach shaft 222. When the Mach Hold switch 35 is engaged, a zero Mach voltage is established as a reference. Any variations in Mach from that time will place a voltage from potentiometer 224 upon conductor 225 which will be analogous to Mach error. This potential is then multiplied by a function of Mach at potentiometer 203, the output of which is fed to contacts of relay 232. The operation of the system from this point on is completely in accordance with that described for the altitude hold mode of operation.

If the instructor desires to simulate failure of the pitch channel he merely depresses switch 304 which will apply a fixed voltage to input impedance 306 of amplifier 254.

In the Glide Path Engaged mode of operation, $K_5$ and $K_9$ are both equal to one while $K_6$, $K_7$ and $K_8$ are all equal to zero. Equation 7 in the Glide Path Engaged mode of operation reduces to Equation 7d set forth below:

*Equation 7d*

$$e_0' = Sse - Wy + \left(\Delta GP + \frac{d\Delta GP}{dt} + \int \Delta GP\, dt\right)$$

Equation 7d is merely Equation 7 with those terms associated with the constants $K_6$, $K_7$ and $K_8$ removed since they are equal to zero. The error in Glide Path signal, delta glide path, ($\Delta GP$), is made up in the radio aids computer 236 and amplified at D.C. amplifier 238. The remainder of Equation 7d is mechanized in a manner analogous to Equations 7b and 7c. In each of the three, the pitch synchronizer shaft 263 is used to derive the integral of the error input potential. The output of the synchronizer shaft 263 is fed by conductor 248 to the demodulator 268 whose output in turn is fed by conductor 227a to the input impedance 280.

YAW CHANNEL

The third major channel of autopilot operation is designated as the Yaw Channel. The operation of the aircraft rudder positioning servo loop is simulated through the flight simulator control force loop which, when the autopilot is engaged, positions the simulator's rudder pedals. The rudder pedal shaft 339 then presents a voltage analog of the rudder position by means of potentiometer 342 and conductor 24 of FIG. 6 to the flight computer 25.

The Yaw Channel simulation is considerably less complex than that of the actual aircraft system. FIG. 6 shows how the system operates. Any lateral acceleration (a yt) presents an A.C. voltage by means of conductor 313, impedance 318, amplifier 323, output 324, relay 335, demodulator 337 and actuator 338 to the rudder pedal position shaft 339 of the correct phase and magnitude to cause a rudder pedal deflection in the direction to reduce the lateral acceleration to zero. The rate of change of side slip angle ($dB/dt$) on conductor 312 and impedance 319 is used for damping. Feedback is used around the rudder pedal position shaft 339 by position "answer" voltage potentiometer 341 and conductor 344 which is connected to the impedance 321 and the amplifier 323 and by utilizing generator 340 damping feedback through conductor 343 to the input 336 of the clutch demodulator 337. The magnetic fluid actuator 338 drives shaft 339. The rudder trim indicator 334 is fed by a circuit which performs the same functions as the trim indicator circuits in the pitch and roll channels. The simulator rudder force computer 325 feeds an analog voltage proportional to rudder force by conductor 326 to amplifier 327 whose output 328 is conducted to contacts on relays 329 and 335. These relays become energized when the yaw channel is engaged and are so arranged that the computer voltage from amplifier 327 is applied to the rudder pedal actuator and the autopilot voltage output 324 is applied to the rudder trim indicator 334 when the autopilot is not engaged. These are applied through relay 329 which is connected through a 60 cycle demodulator 331 and D.C. amplifier 332 to indicator 334 on trim meter 37 of FIG. 2. When autopilot is engaged the two voltages are switched by relays 329 and 335. The instructor may fail the yaw channel of the autopilot by operation of switch 314 which activates relay 315 so as to apply a fixed voltage by conductor 316 to input impedance 320 of amplifier 323. Since the Yaw Channel autopilot system maintains a zero lateral acceleration when the rudder switch 32 of mode selector control panel 13 is On, zero ball angle will be maintained. The ball angle indicator in the flight simulator is the pilot's only indication of a coordinated turn. Thus, the simulation, as shown in FIG. 6, performs the necessary yaw channel function.

It is thus seen that the three axis of aircraft flight, roll, pitch and yaw, have been realistically simulated by this autopilot simulation system. The various modes of operation within the three channels simulated perform and satisfy the requirements of an exacting autopilot system as found in the actual aircraft.

It is apparent that automatic control systems for nuclear reactors and reactors, for example, could be simulated in a like manner. Thus, for example, distribution of fast and thermal neutrons, time dependent response, zenon poisoning, temperature, reactor water level, radioactivity level and others would be representative of the characteristic variables.

Having described a preferred embodiment of the present invention, it is to be understood that although specific terms and examples are employed, they are used in a generic and descriptive sense and not for purposes of limitation; the scope of the invention being set forth in the following claims:

What is claimed is:

1. In a flight training device having computers for determining the value of simulated flight conditions and roll shaft means for developing roll information at the output thereof, apparatus for simulating an automatic flight control system comprising the combination of a simulated roll channel having manually operable means for simulating a heading hold mode of operation including potentiometers for developing two voltages proportional to the error between the actual heading and the desired heading in response to actuation of said heading hold means, electromechanical integrating means responsive to one of the error voltages for producing a voltage proportional to the integral of the heading error with respect to time, a control wheel, combining means responsive to the output of the integrating means, the other heading error voltage and the output of the training device roll shaft means for developing a single potential value representative of the total force to be applied to said control wheel, said control wheel having motive means responsive to the last named means for positioning the control wheel in accordance with the output of the combining means, and potentiometer means responsive to the position of the control wheel for generating a potential which is adapted to be fed to the flight training device which is analogous to the position of the control wheel.

2. In a flight training device having computers for determining the value of simulated flight conditions including roll angle, apparatus for simulating an automatic flight control system comprising a simulated roll channel having means for simulating a turn knob mode of operation including a turn knob demand control for developing a potential proportional to the rate of turn desired, roll shaft means for developing potentials analogous to the sine of the roll angle and the rate of change of the roll angle, a control wheel having means connected thereto for generating voltages proportional to the position and rate of change of position of the control wheel, combining means responsive to the potential output of the turn knob demand control, the control wheel position voltage, the rate of change of control wheel position voltage, the output of the training device roll shaft analogous to the sine of the roll angle and the rate of change of roll angle voltage for developing a potential value representative of the total force to be applied to said control wheel, said control wheel having motive means responsive to the combining means for positioning the control wheel in accordance with the output of the combining means and means connected to said roll channel for simulating disablement thereof.

3. In a flight training device having computers for determining the value of simulated flight conditions including heading, apparatus for simulating an automatic flight control system comprising a simulated roll channel having roll shaft means for producing voltages analogous to the sine of the roll angle and rate of change of roll angle, said roll channel having means for simulating a heading select mode of operation including a heading select control for developing voltage proportional to the difference between the actual aircraft heading and the heading desired, a control wheel having means for generating a voltage proportional to the position and rate of change of the position of the control wheel, combining means responsive to the difference heading voltage, the control wheel position voltage, the rate of change of control wheel position voltage, the voltage output of the training device roll shaft analogous to the sine of the roll angle and the rate of change of roll angle voltage for developing a potential value representative of the total force to be applied to said control wheel, said control wheel having motive means responsive to the combining means for positioning the control wheel in accordance with the output of the combining means and means connected to said roll channel for simulating the disablement thereof.

4. In a flight training device having computers for determining the value of simulated flight conditions including roll angle, apparatus for simulating an automatic flight control system comprising a simulated roll channel having roll shaft means for producing an output voltage analogous to the roll angle and having means for simulating a visual omnirange-localizer mode of operation including means for developing a heading error potential proportional to the difference between the actual aircraft heading and the heading required to be in directional alignment with a radio beam transmitting station, electromechanical integrating means responsive to the heading error potential for producing a potential proportional to the integral of the heading error potential with respect to time, a control wheel having means for generating potentials proportional to the position of the control wheel and the rate of change of position of the control wheel, combining means responsive to the heading error potential, the heading error integral potential, the control wheel position potential, the control wheel rate of change of position potential, and the output of the training device roll shaft means for developing a potential value representative of the total force to be applied to said control wheel, said control wheel having motive means responsive to the last named means for positioning the control wheel in accordance with the output of the combining means.

5. In a flight training device having a pitch angle shaft and computers for determining the value of simulated flight conditions including pitch angle and pitching rate, apparatus for simulating an automatic flight control system comprising a simulated pitch channel having means for simulating a pitch hold mode of operation including means for selecting a desired pitch angle, means for developing a pitch error potential proportional to the difference between the pitch angle and the desired pitch angle, a control column member having means for generating a potential proportional to the position of the control column member, combining means responsive to the pitch error potential, the control column position potential and the output of the training device pitch shaft for developing a potential value representative of the total force to be applied to said control column member, said control column member having motive means responsive to the combining means for positioning the control column member in accordance with the output of the combining means and means connected to said pitch channel for simulating disablement thereof.

6. In a flight training device having computers for determining the value of simulated flight conditions including altitude and rate of change of pitch angle, apparatus for simulating an automatic flight control system comprising means for establishing a simulated altitude hold mode of operation of said flight control system including means for selecting a desired flight altitude, means for developing an altitude error potential proportional to the difference between the actual altitude and the desired altitude, means for generating a potential proportional to the rate of change of error potential, electromechanical integrating means responsive to the altitude error potential for producing a potential proportional to the integral of the altitude error with respect to time, a control column member having potential generating means of a value proportional to the position of the control column member, means for generating a potential proportional to the rate of change of pitch angle, combining means responsive to the altitude error potential, the altitude rate of change potential, the altitude error integral potential, the control column postiion potential and the rate of change of pitch angle potential for developing a potential value representative of the total force to be applied to said control column member, said control column member having motive means responsive to the combining means for positioning the control column member in accordance with the output of the combining means and means responsive to the position of the control wheel for generating a potential to be fed to the flight training device which is analogous to the position of the control column member.

7. In a flight training device having computers for determining the value of simulated flight conditions including Mach number and rate of change of pitch angle and producing potentials analogous thereto, apparatus for simulating an automatic flight control system comprising means for establishing a simulated Mach number hold mode of operation including means for selecting a desired flight Mach number, means for developing a Mach number error potential proportional to the difference between the actual Mach number and the desired Mach number, means for generating a potential proportional to the rate of change of error potential, electromechanical integrating means responsive to the Mach number error potential for producing a potential proportional to the integral of the Mach number error with respect to time, a control column member having means for generating a potential of a value proportional to the position of the control column member, combining means responsive to the Mach number error potential, the Mach number rate of change potential, the Mach number error integral potential, the control column position potential and the rate of change of pitch angle potential for developing a potential value representative of the total force to be applied to said control column member, said control column member having motive means responsive to the combining means for positioning the control column member in accordance with the output of the combining means.

8. In a flight training device having computers for determining the value of simulated flight conditions including altitude and pitching rate and producing potentials proportional thereto, apparatus for simulating an automatic flight control system comprising switching means for connecting said apparatus for establishing a simulated glide path mode of operation including means for developing a glide path error potential proportional to the difference in altitude between the aircraft and the glide path, means for generating a potential proportional to the rate of change of glide path error potential, electromechanical integrating means responsive to the glide path error potential for producing a potential proportional to the integral of the glide path error wtih respect to time, a control column member having means for generating a potential proportional to the position of the control column member, combining means responsive to the said potentials and the pitching rate potential from the training device for developing a potential value representative of the total force to be applied to said control column member, said control column member having motive means responsive to the combining means for positioning the control column member in accordance with the output of the combining means.

References Cited in the file of this patent
UNITED STATES PATENTS

| | | |
|---|---|---|
| 2,351,977 | Kromenberger et al. | June 20, 1944 |
| 2,460,743 | Germanton | Feb. 1, 1949 |
| 2,471,821 | Kutzler et al. | May 31, 1949 |
| 2,584,261 | Davis et al. | Feb. 5, 1952 |
| 2,614,776 | Rossire | Oct. 21, 1952 |
| 2,620,463 | Meredith | Dec. 2, 1952 |
| 2,636,285 | Fogarty et al. | Apr. 28, 1953 |
| 2,659,554 | Murphy | Nov. 17, 1953 |
| 2,701,922 | Dehmel | Feb. 15, 1955 |
| 2,842,867 | Dehmel | July 15, 1958 |
| 2,859,926 | Westbury | Nov. 11, 1958 |
| 2,861,756 | Feucht | Nov. 25, 1958 |

OTHER REFERENCES

Electronic Analog Computers (Text), second edition, 1956, Korn and Korn, McGraw-Hill Book Co.